(12) United States Patent
Yoshizawa et al.

(10) Patent No.: US 12,173,412 B2
(45) Date of Patent: Dec. 24, 2024

(54) SLIDING COMPONENT HAVING WEAR-RESISTANT COATING

(71) Applicant: IHI Corporation, Tokyo (JP)

(72) Inventors: Hiroki Yoshizawa, Tokyo (JP); Mitsutoshi Watanabe, Tokyo (JP); Kenta Kawahara, Tokyo (JP)

(73) Assignee: IHI Corporation, Tokyo (JP)

( * ) Notice: Subject to any disclaimer, the term of this patent is extended or adjusted under 35 U.S.C. 154(b) by 51 days.

(21) Appl. No.: 17/658,747

(22) Filed: Apr. 11, 2022

(65) Prior Publication Data

US 2022/0235469 A1 Jul. 28, 2022

Related U.S. Application Data

(63) Continuation of application No. PCT/JP2020/028059, filed on Jul. 20, 2020.

(30) Foreign Application Priority Data

Nov. 21, 2019 (JP) ................. 2019-210501

(51) Int. Cl.
*C23C 28/00* (2006.01)
*B23K 26/342* (2014.01)
(Continued)

(52) U.S. Cl.
CPC ........ *C23C 28/3455* (2013.01); *B23K 26/342* (2015.10); *B32B 15/04* (2013.01);
(Continued)

(58) Field of Classification Search
CPC ......... C23C 26/00; C23C 26/02; C23C 10/02; C23C 10/38; C23C 10/48; C23C 28/3455;
(Continued)

(56) References Cited

U.S. PATENT DOCUMENTS

| 4,382,976 A | 5/1983 | Restall |
| 2010/0086398 A1 | 4/2010 | Ochiai et al. |

(Continued)

FOREIGN PATENT DOCUMENTS

| DE | 10 2010 049 399 A1 | 5/2011 |
| EP | 1 544 321 A1 | 6/2005 |

(Continued)

OTHER PUBLICATIONS

Machine Translation, Yoshizawa, WO 2018/087945 A1, May 2018. (Year: 2018).*

(Continued)

*Primary Examiner* — Michael E. La Villa
(74) *Attorney, Agent, or Firm* — Oblon, McClelland, Maier & Neustadt, L.L.P.

(57) ABSTRACT

A sliding component having a wear-resistant coating includes a sliding component formed of a Ni alloy, and a wear-resistant coating provided on a sliding surface of the sliding component. The wear-resistant coating has, at least on the surface side thereof, an Al-containing Co alloy layer which contains Co as a main component, at least one of W, Ni, Mo, Fe, Si, and C, Cr, and 0.3% by mass or more and 26% by mass or less of Al.

4 Claims, 8 Drawing Sheets

(51) Int. Cl.
*B32B 15/04* (2006.01)
*B32B 15/20* (2006.01)
*C22C 19/00* (2006.01)
*C22C 19/07* (2006.01)
*C22C 27/06* (2006.01)
*C22C 30/00* (2006.01)
*C22F 1/00* (2006.01)
*C22F 1/10* (2006.01)
*C22F 1/11* (2006.01)
*C23C 10/02* (2006.01)
*C23C 10/38* (2006.01)
*C23C 10/48* (2006.01)
*C23C 26/00* (2006.01)
*C23C 26/02* (2006.01)
*C23C 30/00* (2006.01)
*F01D 5/28* (2006.01)

(52) U.S. Cl.
CPC ............ *B32B 15/043* (2013.01); *B32B 15/20* (2013.01); *C22C 19/007* (2013.01); *C22C 19/07* (2013.01); *C22C 27/06* (2013.01); *C22C 30/00* (2013.01); *C22F 1/00* (2013.01); *C22F 1/10* (2013.01); *C22F 1/11* (2013.01); *C23C 10/02* (2013.01); *C23C 10/38* (2013.01); *C23C 10/48* (2013.01); *C23C 26/00* (2013.01); *C23C 26/02* (2013.01); *C23C 28/321* (2013.01); *C23C 28/3215* (2013.01); *C23C 28/325* (2013.01); *C23C 28/345* (2013.01); *C23C 28/347* (2013.01); *C23C 30/00* (2013.01); *C23C 30/005* (2013.01); *F01D 5/28* (2013.01); *F01D 5/286* (2013.01); *F01D 5/288* (2013.01); *F05D 2220/32* (2013.01); *F05D 2230/90* (2013.01); *F05D 2240/307* (2013.01); *F05D 2300/173* (2013.01); *F05D 2300/2112* (2013.01); *Y10T 428/1259* (2015.01); *Y10T 428/12604* (2015.01); *Y10T 428/12611* (2015.01); *Y10T 428/12618* (2015.01); *Y10T 428/1266* (2015.01); *Y10T 428/12667* (2015.01); *Y10T 428/12931* (2015.01); *Y10T 428/12937* (2015.01); *Y10T 428/12944* (2015.01)

(58) Field of Classification Search
CPC ... C23C 28/321; C23C 28/325; C23C 28/345; C23C 28/3215; C23C 28/347; C23C 30/00; C23C 30/005; B23K 26/342; C22C 19/07; C22C 19/007; C22C 27/06; C22C 30/00; C22F 1/00; C22F 1/10; C22F 1/11; F01D 5/288; F01D 5/28; F01D 5/286; F05D 2220/32; F05D 2230/307; F05D 2300/173; F05D 2300/2112; B32B 15/04; B32B 15/043; B32B 15/20; Y10T 428/12611; Y10T 428/12604; Y10T 428/12618; Y10T 428/1259; Y10T 428/1266; Y10T 428/12667; Y10T 428/12937; Y10T 428/12931; Y10T 428/12944
See application file for complete search history.

(56) References Cited

U.S. PATENT DOCUMENTS

| | | |
|---|---|---|
| 2011/0103967 A1 | 5/2011 | Hoebel et al. |
| 2012/0321478 A1 | 12/2012 | Oikawa et al. |
| 2018/0170004 A1 | 6/2018 | Yoshizawa et al. |
| 2019/0233949 A1 | 8/2019 | Yoshizawa et al. |

FOREIGN PATENT DOCUMENTS

| | | |
|---|---|---|
| JP | 8-71785 A | 3/1996 |
| JP | 9-67661 A | 3/1997 |
| JP | 2013-1949 A | 1/2013 |
| WO | WO 2017/094292 A1 | 6/2017 |
| WO | WO 2018/087945 A1 | 5/2018 |

OTHER PUBLICATIONS

International Search Report issued Oct. 6, 2020 in PCT/JP2020/028059 filed Jul. 20, 2020, 3 pages.
Extended European Search Report issued May 24, 2023 in European Patent Application No. 20890297.3, 12 pages.

\* cited by examiner

FIG. 11
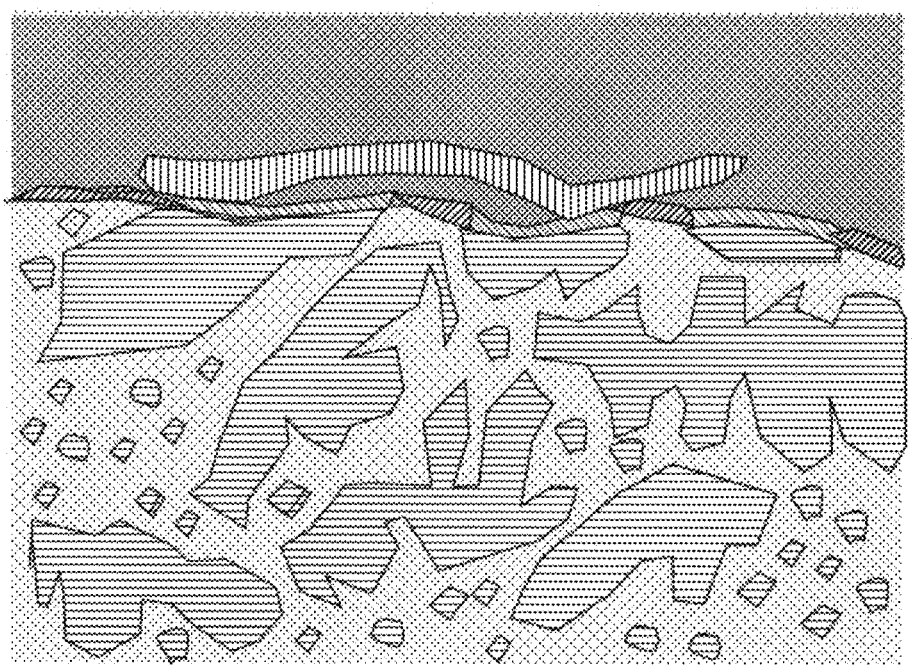
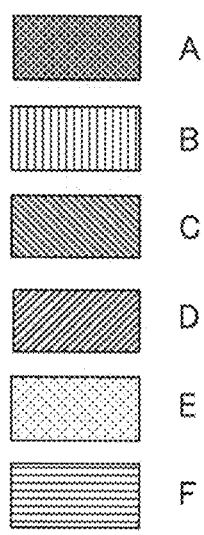
A
B
C
D
E
F

SLIDING COMPONENT HAVING WEAR-RESISTANT COATING

CROSS REFERENCE TO RELATED APPLICATIONS

This application is a continuation application of International Application No. PCT/JP2020/28059, filed on Jul. 20, 2020, which claims priority to Japanese Patent Application No. 2019-210501, filed on Nov. 21, 2019, the entire contents of which are incorporated by references herein.

BACKGROUND

1. Field

The present disclosure relates to a sliding component having a wear-resistant coating and a method for forming a wear-resistant coating.

2. Description of the Related Art

Conventionally, a wear-resistant coating provided on a sliding surface of a sliding component such as a gas turbine component is formed by cladding a Stellite alloy or a Tribaloy alloy of a cobalt (Co)-based alloy by means of TIG welding or the like. Japanese Patent Application Publication No. 2013-1949 (Patent Literature 1) discloses that in a steam turbine long blade, a Stellite alloy of a Co-based alloy is bonded to the blade tip by means of TIG welding.

SUMMARY

With the enhancement of the performance of jet engines and the like, a sliding component such as a gas turbine component may be exposed to a high temperature environment exceeding 1000° C. If a Co-based alloy such as a Stellite alloy or a Tribaloy alloy is exposed to such a high temperature environment, there is a possibility that an oxide coating will spall and detach, and the oxidation resistance will decrease. From the above, if a wear-resistant coating formed of a Co-based alloy such as a Stellite alloy or a Tribaloy alloy is exposed to a high temperature environment exceeding 1000° C., an oxide coating may detach and the wear resistance may decrease.

Accordingly, an object of the present disclosure is to provide a sliding component having a wear-resistant coating whose wear resistance can be enhanced even in a high temperature environment exceeding 1000° C., and a method for forming a wear-resistant coating.

A sliding component including a wear-resistant coating according to the present disclosure includes a sliding component formed of a Ni alloy, and a wear-resistant coating provided on a sliding surface of the sliding component, in which the wear-resistant coating includes an Al-containing Co alloy layer at least on a surface side thereof, the Al-containing Co alloy layer containing Co as a main component, at least one of W, Ni, Mo, Fe, Si, and C, Cr, and 0.3% by mass or more and 26% by mass or less of Al.

In the sliding component including the wear-resistant coating according to the present disclosure, the Al-containing Co alloy layer may include a CoAl layer that is provided on the surface side of the wear-resistant coating and includes a CoAl phase, and an intermediate layer that is provided on a sliding component side of the CoAl layer, includes a smaller Al content than the CoAl layer, and includes or does not include a CoAl phase.

In the sliding component including the wear-resistant coating according to the present disclosure, the wear-resistant coating may include a Co alloy layer that is provided on a sliding component side of the Al-containing Co alloy layer and is formed of a Co alloy, the Co alloy containing at least one of W, Ni, Mo, Fe, Si, and C, Cr, and a balance of Co as a main component and inevitable impurities.

In the sliding component including the wear-resistant coating according to the present disclosure, the wear-resistant coating may further include a first oxide layer that is formed on a surface of the Al-containing Co alloy layer and includes an Al oxide and a Cr oxide, and a second oxide layer that is formed on a surface of the first oxide layer and includes an Al oxide and a Cr oxide, and the first oxide layer may include a larger content of the Al oxide than the second oxide layer, and the second oxide layer may include a larger content of the Cr oxide than the first oxide layer.

A method for forming a wear-resistant coating according to the present disclosure includes a cladding step for cladding a Co alloy on a sliding surface of a sliding component formed of a Ni alloy to form a cladding layer, the Co alloy containing at least one of W, Ni, Mo, Fe, Si, and C, Cr, and a balance of Co as a main component and inevitable impurities, and an Al diffusion coating step for subjecting the sliding component on which the cladding layer is formed to an Al diffusion coating to set an Al content at least on a surface side of the cladding layer to 0.3% by mass or more and 26% by mass or less.

In the Al diffusion coating step of the method for forming the wear-resistant coating according to the present disclosure, a treatment material formed by mixing an Al raw material, an activator, and a sintering inhibitor, and the sliding component on which the cladding layer is formed may be heat-treated in a non-oxidizing atmosphere, the Al raw material being formed of at least one of an Al powder and an Al pellet and being formed of pure Al or an Al alloy.

In the method for forming the wear-resistant coating according to the present disclosure, the sliding component is formed of a Ni alloy containing Al, and in the Al diffusion coating step, the sliding component on which the cladding layer is formed may be heat-treated in a non-oxidizing atmosphere.

A method for forming a wear-resistant coating according to the present disclosure includes a cladding step for forming a cladding layer by cladding a cladding material that includes a Co alloy and an Al raw material on a sliding surface of a sliding component formed of a Ni alloy and setting an Al content at least on a surface side of the cladding layer to 0.3% by mass or more and 26% by mass or less, the Co alloy containing at least one of W, Ni, Mo, Fe, Si, and C, Cr, and a balance of Co as a main component and inevitable impurities.

A method for forming a wear-resistant coating according to the present disclosure includes a cladding step for forming a cladding layer by cladding a cladding material formed of a Co alloy on a sliding surface of a sliding component formed of an Al-containing Ni alloy containing Al, and blending the Al-containing Ni alloy into the cladding layer during cladding to set an Al content at least on a surface side of the cladding layer to 0.3% by mass or more and 26% by mass or less, the Co alloy containing at least one of W, Ni, Mo, Fe, Si, and C, Cr, and a balance of Co as a main component and inevitable impurities.

A method for forming a wear-resistant coating according to the present disclosure includes an electrode forming step for forming an electrical discharge coating electrode by mixing a Co alloy powder with an Al raw material powder, the Co alloy powder containing at least one of W, Ni, Mo, Fe, Si, and C, Cr, and a balance of Co as a main component and inevitable impurities, and an electrical discharge coating step for forming a cladding layer on a sliding surface of a sliding component by performing an electrical discharge coating of generating a discharge between the electrical discharge coating electrode and the sliding component formed of a Ni alloy and setting an Al content at least on a surface side of the cladding layer to 0.3% by mass or more and 26% by mass or less.

A method for forming a wear-resistant coating according to the present disclosure includes an electrode forming step for forming an electrical discharge coating electrode with an Al-containing Co alloy powder, the Al-containing Co alloy powder containing at least one of W, Ni, Mo, Fe, Si, and C, Cr, 0.3% by mass or more of Al, and a balance of Co as a main component and inevitable impurities, and an electrical discharge coating step for forming a cladding layer on a sliding surface of a sliding component by performing an electrical discharge coating of generating a discharge between the electrical discharge coating electrode and the sliding component formed of a Ni alloy and setting an Al content at least on a surface side of the cladding layer to 0.3% by mass or more and 26% by mass or less.

According to the above configuration, the oxidation resistance of a wear-resistant coating is excellent even in a high temperature environment exceeding 1000° C., and thus the wear resistance of a sliding component having a wear-resistant coating can be enhanced.

BRIEF DESCRIPTION OF DRAWINGS

FIG. 11 is a schematic diagram of a metal structure corresponding to the photograph of FIG. 10 in an embodiment of the present disclosure.

DESCRIPTION OF EMBODIMENTS

First Embodiment

Figure 1:
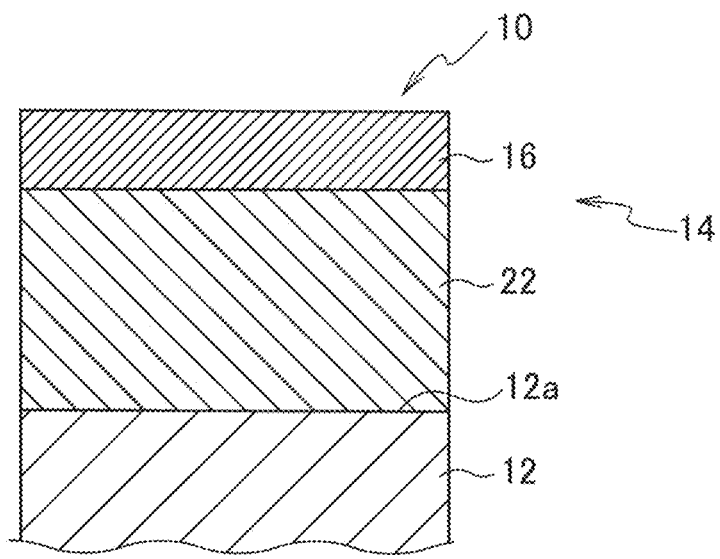
FIG. 1 is a cross-sectional view showing the constitution of a sliding component having a wear-resistant coating in an embodiment of the present disclosure.

Hereinafter, a first embodiment of the present disclosure will be described in detail with reference to the drawings. FIG. 1 is a sectional view showing the constitution of a sliding component 10 having a wear-resistant coating. The sliding component 10 with a wear-resistant coating includes a sliding component 12 and a wear-resistant coating 14 provided on a sliding surface 12a of the sliding component 12.

The sliding component 12 is a gas turbine component or the like, for example, and is a component exposed to a high temperature environment exceeding 1000° C., such as a jet engine component for an aircraft or a gas turbine component for industrial use. An example of a jet engine component for an aircraft is a turbine blade in which shroud portions are integrated, or the like. The sliding surface 12a of the sliding component 12 is subjected to, for example, fretting wear, impact wear, and the like. In fretting wear, a surface pressure is applied and a very small repetitive sliding motion is repeated. In impact wear, periodic pressure and sliding are repeated.

The sliding component 12 is formed of a Ni alloy. As a Ni alloy, a Ni-based single crystal alloy, a Ni-based unidirectionally solidified alloy, or the like can be used. Such a Ni-based single crystal alloy or the like is an Al-containing Ni alloy, and is a precipitation hardening type alloy. An Al-containing Ni alloy is formed by adding Al and the like to Ni as a base. A precipitation hardening type alloy is formed by dispersing a $\gamma'$-$Ni_3Al$ phase as a precipitation phase in a $\gamma$-Ni solid solution phase as a mother phase. The content of Al contained in a Ni-based single crystal alloy or the like is, for example, 1% by mass or more and 10% by mass or less. A Ni-based single crystal alloy or the like is generally subjected to a solution treatment, and then to an aging treatment to improve mechanical strength.

For a Ni alloy, it is possible to use, for example, PWA 1480, Rene N4, SRR 99, AM1, AM3, CMSX-2, MC2, CMSX-4, PWA 1484, SC 180, Rene N5, CMSX-10, Rene N6, RR 2100, TMS-75, EPM 102, TMS-173, TMS-138, TMS-162, TMS-196, and the like.

The wear-resistant coating 14 includes, on at least the surface side of the wear-resistant coating 14, an Al-containing Co alloy layer 16 that contains Co (cobalt) as a main component, at least one of W (tungsten), Ni (nickel), Mo (molybdenum), Fe (iron), Si (silicon), and C (carbon), Cr (chromium), and 0.3% by mass or more and 26% by mass or less of Al (aluminum).

The Al-containing Co alloy layer 16 is formed containing Co as a main component, at least one of W, Ni, Mo, Fe, Si, and C, Cr, and 0.3% by mass or more and 26% by mass or less of Al. The Al-containing Co alloy layer 16 may contain at least one of W, Ni, Mo, Fe, Si, and C, Cr, and 0.3% by mass or more and 26° by mass or less of Al, and the balance may be formed of Co as a main component and inevitable impurities.

The Al-containing Co alloy layer 16 is mainly formed of Co. A main component is the component with the largest content in an alloy among components contained in the alloy (the same applies hereinafter). For example, the content of Co in the Al-containing Co alloy layer 16 may be 30% by mass or more and 90% by mass or less, may be 40% by mass or more and 80° by mass or less, and may be 40° by mass or more and 60% by mass or less.

The Al-containing Co alloy layer 16 contains at least one of W, Ni, Mo, Fe, Si, and C. These alloy components can form a strengthening phase formed of carbides, intermetallic compounds such as Laves phases, andetu the like. This can enhance the hardness of the Al-containing Co alloy layer 16 to improve the wear resistance of the wear-resistant coating 14.

The Al-containing Co alloy layer 16 contains Cr. Cr forms a protective oxide coating made of a Cr oxide such as $Cr_2O_3$ which is excellent in high temperature lubricity and oxidation resistance. Accordingly, the wear resistance of the wear-resistant coating 14 can be enhanced. The Al-containing Co alloy layer 16 may contain 8% by mass or more and 30% by mass or less of Cr. The reason why the content of Cr is 8% by mass or more is because, if the content of Cr is less than 8% by mass, it becomes difficult to form Cr oxide on the surface side of the Al-containing Co alloy layer 16 during thermal exposure. The reason why the content of Cr is 30% by mass or less is because, if the content of Cr is 30% by mass, a Cr oxide can be sufficiently formed on the surface side of the Al-containing Co alloy layer 16.

The Al-containing Co alloy layer 16 contains Al. Al forms a dense protective oxide coating made of an Al oxide such as $Al_2O_3$ which is excellent in oxidation resistance at a high temperature exceeding 1000° C. Accordingly, the oxidation resistance of the wear-resistant coating 14 can be enhanced. The Al-containing Co alloy layer 16 contains 0.3% by mass or more and 26% by mass or less of Al. The reason why the content of Al is 0.3% by mass or more is because, if the content of Al is less than 0.3% by mass, it becomes difficult to form an Al oxide on the surface side of the Al-containing Co alloy layer 16 during thermal exposure. The reason why the content of Al is 26% by mass or less is because, if the content of Al is 26% by mass, an Al oxide can be sufficiently formed on the surface side of the Al-containing Co alloy layer 16. Further, the reason is because, if the content of Al is more than 26% by mass, the Al-containing Co alloy layer 16 easily becomes brittle.

The Al-containing Co alloy layer 16 can be formed of an Al-containing Co alloy which is formed by further adding Al to a Stellite alloy, a Tribaloy alloy, or the like. A Stellite alloy and a Tribaloy alloy are Co alloys with excellent wear resistance which do not contain Al.

A Stellite alloy is formed of a Co alloy containing W, Ni, Mo, Fe, Si, C, and Cr, with the balance being Co as a main component and inevitable impurities, a Co alloy containing Ni, Mo, Fe, Si, C, and Cr, with the balance being Co as a main component and inevitable impurities, a Co alloy containing W, Ni, Fe, Si, C, and Cr, with the balance being Co as a main component and inevitable impurities, a Co alloy containing Fe, Si, C, and Cr, with the balance being Co as a main component and inevitable impurities, or the like. A Stellite alloy contains, for example, 19° by mass or more and 30% by mass or less of Cr. Since fine carbides such as WC are dispersed in a Stellite alloy, a Stellite alloy is hard and has excellent wear resistance. As a Stellite alloy, for example, a Stellite 31 alloy or the like can be used. As an Al-containing Co alloy, an Al-containing Co alloy which is formed by further adding Al in this kind of Stellite alloy may be used.

A Tribaloy alloy is formed of a Co alloy containing Ni, Mo, Fe, Si, C, and Cr, with the balance being Co as a main component and inevitable impurities, a Co alloy containing Ni, Mo, Si, C, and Cr, with the balance being Co as a main component and inevitable impurities, or the like. A Tribaloy alloy contains, for example, 8.5% by mass or more and 18% by mass or less of Cr. Since fine intermetallic compounds of Mo and Si are dispersed in a Tribaloy alloy, a Tribaloy alloy is hard and has excellent wear resistance. As a Tribaloy alloy, a Tribaloy T-400 alloy, a Tribaloy T-800 alloy, or the like can be used. As an Al-containing Co alloy, an Al-containing Co alloy which is formed by further adding Al in such a Tribaloy alloy may be used.

The thickness of the Al-containing Co alloy layer 16 may be, for example, 5 μm or thicker and 1000 μm or thinner. The reason why the thickness is set as above is because, if the thickness of the Al-containing Co alloy layer 16 is thinner than 5 μm, there is a possibility that an Al oxide, a Cr oxide, or the like is not be sufficiently formed during thermal exposure. Further, the reason is because, if the thickness of the Al-containing Co alloy layer 16 is thicker than 1000 μm, there is a possibility that the layer will detach. The thickness of the Al-containing Co alloy layer 16 may be 5 μm or thicker and 500 μm or thinner, or 5 μm or thicker and 200 μm or thinner.

Figure 2:
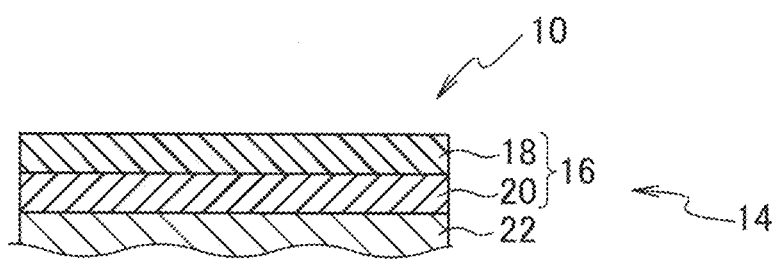
FIG. 2 is a cross-sectional view showing the structure of an Al-containing Co alloy layer formed of a plurality of layers in an embodiment of the present disclosure.

The Al-containing Co alloy layer 16 may be formed not only of a single layer but also of a plurality of layers. FIG. 2 is a sectional view showing the structure of the Al-containing Co alloy layer 16 formed of a plurality of layers. The Al-containing Co alloy layer 16 may include a CoAl layer and an intermediate layer 20. The CoAl layer 18 is provided on the surface side of the wear-resistant coating 14 and is formed by containing a CoAl phase. The CoAl layer 18 contains a CoAl phase which is an intermetallic compound of Co and Al. The CoAl phase contains a larger amount of Al, and thus a larger amount of Al oxide can be formed by selective oxidation during thermal exposure of the wear-resistant coating 14. The thickness of the CoAl layer 18 may be, for example, 5 μm or thicker and 50 μm or thinner, or 5 μm or thicker and 20 μm or thinner.

The intermediate layer 20 is provided on the sliding component 12 side of the CoAl layer 18, and has a smaller content of Al than the CoAl layer 18. The intermediate layer 20 is formed by containing or not containing a CoAl phase. The intermediate layer 20 functions as a stress relaxation layer for relaxing thermal stress between the CoAl layer 18 and the sliding component 12 or a Co alloy layer 22 which will be described later. The intermediate layer 20 is formed by diffusion in association with the formation of the CoAl layer 18. The intermediate layer 20 may or may not include a CoAl phase. The thickness of the intermediate layer 20 varies depending on the formation conditions of the CoAl layer 18, but the thickness may be, for example, 10 μm or thicker and 700 μm or thinner, or 10 μm or thicker and 200 μm or thinner.

The wear-resistant coating 14 may have the Co alloy layer 22 which is provided on the sliding component 12 side of the Al-containing Co alloy layer 16 and is formed of a Co alloy. The Co alloy contains at least one of W, Ni, Mo, Fe, Si, and C, Cr, and a balance of Co as a main component and inevitable impurities. The Co alloy layer 22 can be formed of a Co alloy such as a Stellite alloy or a Tribaloy alloy. The thickness of the Co alloy layer 22 is determined in consideration of the wear amount calculated from the operation time until the inspection of an actual equipment such as a jet engine, and the safety factor, and is set to be 100 μm or thicker and 3000 μm or thinner. It is needless to say that the entire wear-resistant coating 14 may be formed of the Al-containing Co alloy layer 16 and may not include the Co alloy layer 22.

Figure 3:
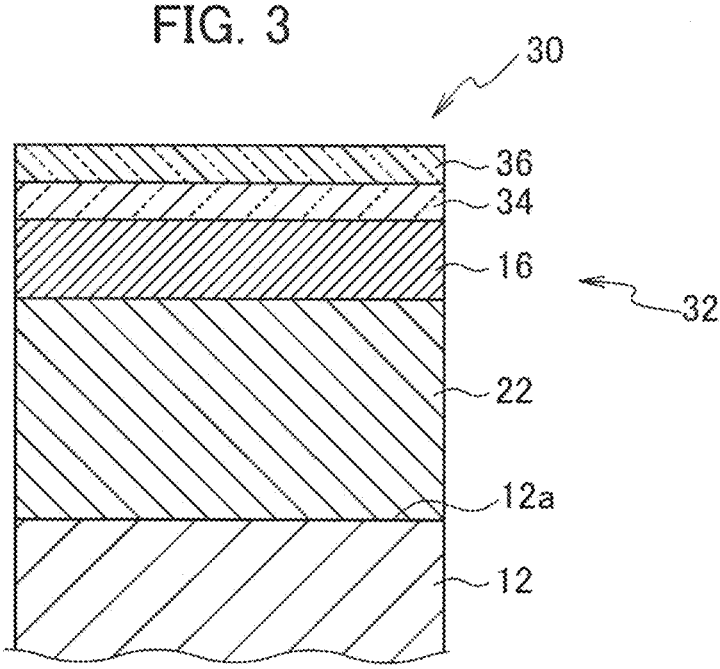
FIG. 3 is a diagram showing the constitution of a sliding component having a wear-resistant coating after thermal exposure in an embodiment of the present disclosure.

Next, the function of the sliding component 10 with a wear-resistant coating will be described. FIG. 3 is a diagram showing the constitution of a sliding component 30 with a wear-resistant coating after thermal exposure. First, before thermal exposure, in the sliding component 10 with a wear-resistant coating, the outermost surface layer of the wear-resistant coating 14 is formed of the Al-containing Co alloy layer 16. When the sliding component 10 with a wear-resistant coating is thermally exposed to a high temperature environment in an oxidizing atmosphere such as an air atmosphere during the operation of an actual equipment such as a jet engine, the Al-containing Co alloy layer 16 is oxidized. Accordingly, a wear-resistant coating 32 after thermal exposure further includes a first oxide layer 34 and a second oxide layer 36 on a surface of the Al-containing Co alloy layer 16. The wear-resistant coating 32 slides directly against an opposite member.

The first oxide layer 34 is formed on a surface of the Al-containing Co alloy layer 16 and contains an Al oxide and a Cr oxide. The second oxide layer 36 is formed on a surface of the first oxide layer 34, and contains an Al oxide and a Cr oxide. The first oxide layer 34 has a larger content of Al oxide than the second oxide layer 36. The second oxide layer 36 has a larger content of Cr oxide than the first oxide layer 34.

More specifically, when the sliding component 10 with a wear-resistant coating is thermally exposed to a high temperature environment in an oxidizing atmosphere such as an air atmosphere, the oxygen partial pressure of the surface of the Al-containing Co alloy layer 16 is high. In such a state, first, Cr is mainly oxidized more than Al contained in the Al-containing Co alloy layer 16, and then the second oxide layer 36 is formed on the surface of the Al-containing Co alloy layer 16. The formation of the second oxide layer 36 lowers the oxygen partial pressure on the surface of the Al-containing Co alloy layer 16. This decreases the oxidation of Cr contained in the Al-containing Co alloy layer 16 and increases the oxidation of Al. Accordingly, the first oxide layer 34 is formed between the second oxide layer 36 and the Al-containing Co alloy layer 16. From the above, the first oxide layer 34 has a larger content of Al oxide than the second oxide layer 36, and the second oxide layer 36 has a larger content of Cr oxide than the first oxide layer 34.

The second oxide layer 36 has a larger content of Cr oxide than the first oxide layer 34, and thus wear resistance is enhanced on the surface of the wear-resistant coating 32 after thermal exposure. The reason for the enhancement is because a Cr oxide has greater high temperature lubricity and superior wear resistance compared to an Al oxide. Meanwhile, the first oxide layer 34 has a larger content of Al oxide than the second oxide layer 36, and thus the oxidation of the Al-containing Co alloy layer 16 is suppressed even in a high temperature environment exceeding 1000° C. The reason for the suppression is because, compared to a Cr oxide, an Al oxide forms a more dense protective oxide coating even in a high temperature environment exceeding 1000° C., has higher adhesiveness to the Al-containing Co alloy layer 16, and has superior oxidation resistance even in a high temperature environment exceeding 1000° C. As described above, the sliding component 30 with a wear-resistant coating after thermal exposure can have the enhanced wear resistance even in a high temperature environment exceeding 1000° C.

When the Al-containing Co alloy layer 16 is formed of an Al-containing Co alloy which is formed by further adding Al in a Tribaloy alloy such as T-800, the Al-containing Co alloy layer 16 contains a Co alloy phase and a Laves phase. In such a case, a first oxide layer 34 formed on the surface of a Laves phase has a larger content of Al oxide than a first oxide layer 34 formed on the surface of a Co alloy phase. When the Al-containing Co alloy layer 16 is thermally exposed, a Laves phase tends to concentrate on the surface side of the Al-containing Co alloy layer 16. As describe above, by forming the first oxide layer 34 with a large content of Al oxide on the surface of a Laves phase, the oxidation resistance can be further enhanced.

Figure 4:
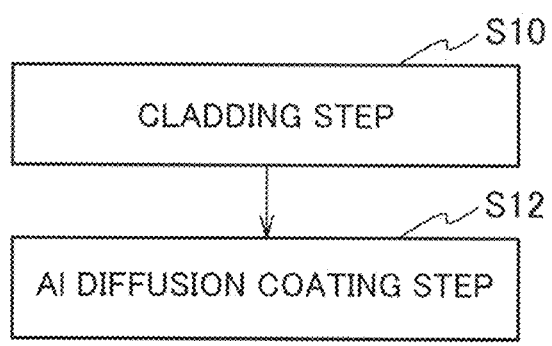
FIG. 4 is a flow chart showing a method for forming a wear-resistant coating in an embodiment of the present disclosure.

Next, a method for forming the wear-resistant coating 14 will be described. FIG. 4 is a flow chart showing a method for forming the wear-resistant coating 14. The method for forming the wear-resistant coating 14 includes a cladding step (S10) and an Al diffusion coating step (S12).

The cladding step (S10) is a step for cladding a Co alloy on a sliding surface 12a of the sliding component 12 which is formed of a Ni alloy to form a cladding layer. A Co alloy contains at least one of W, Ni, Mo, Fe, Si, and C, Cr, and a balance of Co as a main component and inevitable impurities.

As a cladding method, for example, laser cladding welding, TIG welding, thermal spraying, or the like can be used. As a cladding material, a Co alloy powder made of a Stellite alloy or a Tribaloy alloy can be used. As a cladding material, for example, a Co alloy powder formed based on a gas atomization method or a water atomization method can be used. When the cladding method is laser cladding welding, the sliding surface 12a of the sliding component 12 may be irradiated with a laser beam while supplying a shielding gas to the sliding surface 12a to weld a cladding material by laser cladding. As a laser cladding apparatus, for example, a known laser cladding apparatus such as a laser cladding system manufactured by TRUMPF can be used. The thickness of a cladding layer may be, for example, 5 µm or more and 3000 µm or less, 5 µm or more and 1000 µm or less, or 5 µm or more and 500 µm or less.

The Al diffusion coating step (S12) is a step in which the sliding component 12 having a cladding layer formed thereon is subjected to an Al diffusion coating to set the content of Al at least on the surface side of the cladding layer to 0.3% by mass or more and 26% by mass or less.

The Al diffusion coating (an aluminizing treatment) can be performed by heat-treating a treatment material and the sliding component 12 having the cladding layer formed thereon in a non-oxidizing atmosphere. The treatment material is formed by mixing an Al raw material, an activator, and a sintering inhibitor, the Al raw material being made of at least one of an Al powder and Al pellets and being formed of pure Al or an Al alloy. A treatment material is heated to form an aluminum halide or the like, and Al is diffused and infiltrated into a cladding layer. The sliding component 12 having the cladding layer formed thereon may be embedded in a treatment material or disposed near a treatment material.

As an Al raw material, a pure Al powder or an Al alloy powder can be used. As an Al raw material, pure Al pellets or Al alloy pellets may be used. As an Al alloy powder and Al alloy pellets, an Al—Cr alloy, an Al—Si alloy, or the like can be used. As an activator, a halide such as a chloride or a fluoride may be used. For example, as an activator, ammonium chloride ($NH_4Cl$), aluminum fluoride ($AlF_3$), or the like can be used. As a sintering inhibitor, an alumina ($Al_2O_3$) powder or the like can be used. Commercially available products can be used as an Al raw material, an activator, and a sintering inhibitor.

Next, an Al raw material, an activator, and a sintering inhibitor are mixed to prepare a treatment material. The treatment material may contain, for example, 5% by mass or more and 40% by mass or less of an Al raw material and 1% by mass or more and 5% by mass or less of an activator, and the balance may be formed of a sintering inhibitor. The ratio of an Al raw material may be 5% by mass or more and 20% by mass or less, or 10° by mass or more and 20° by mass or less. Then, the treatment material is placed in a ceramic container or the like.

The treatment material and the sliding component 12 having the cladding layer formed thereon are heat-treated in a non-oxidizing atmosphere. Due to the heat treatment, an Al raw material and an activator react to form, for example, an aluminum halide such as aluminum chloride. Due to the reaction of the aluminum halide with the cladding layer formed on the sliding component 12, Al is deposited on the surface of the cladding layer to form an Al deposition layer. Then, the Al deposition layer and the cladding layer inter-diffuse to form the Al-containing Co alloy layer 16. When the sliding component 12 is formed of an Al-containing Ni alloy such as a Ni-based single crystal alloy, Al vapor is generated from the Al-containing Ni alloy, and thus Al can be further diffused into the cladding layer. As an Al raw material, when an Al alloy powder or Al alloy pellets formed of an Al—Cr alloy, an Al—Si alloy, or the like are used, Cr, Si, and the like can be deposited on the surface of the cladding layer together with Al.

The heat-treatment temperature may be 650° C. or higher and 1100° C. or lower. A reason for this temperature range is because, if the heat-treatment temperature is lower than 650° C., almost no aluminum halide is formed, and this makes it difficult to form the Al-containing Co alloy layer 16. A further reason is because, if the heat-treatment temperature is higher than 1100° C., a large number of aluminum halides are formed, and accordingly the thickness of the Al-containing Co alloy layer 16 increases and the Al-containing Co alloy layer 16 easily detaches.

The heat-treatment time varies depending on the heat-treatment temperature, but the heat-treatment time may be set to 5 minutes or longer and 2 hours or shorter when the heat-treatment temperature is 1100° C. A reason for this time range is because, if the heat-treatment time is shorter than 5 minutes, almost no deposition of Al is generated on the surface of the cladding layer, and this makes it difficult to form the Al-containing Co alloy layer 16. A further reason is because, if the heat-treatment time is longer than 2 hours, the amount of Al deposited on the surface of the cladding layer becomes large, and this makes it difficult for the performance of the wear-resistant coating 14 to be exhibited.

The heat-treatment atmosphere may be a non-oxidizing atmosphere such as an inert gas atmosphere such as argon gas or a reducing atmosphere such as hydrogen gas in order to prevent oxidation and the like of the sliding component 12 having the cladding layer formed thereon and an Al raw material. As a diffusion coating apparatus, a heat-treatment apparatus or the like used for the diffusion coating of a general metallic material can be used.

In addition, an Al diffusion coating (an aluminizing treatment) may be performed by heat-treating the sliding component 12 having the cladding layer formed thereon in a non-oxidizing atmosphere, the sliding component 12 being formed of an Al-containing Ni alloy containing Al. When an Al-containing Ni alloy is heat-treated in a non-oxidizing atmosphere, Al contained in the Al-containing Ni alloy is vaporized to generate Al vapor. Al vapor deposits Al on the surface of the cladding layer to form an Al deposition layer. Then, the Al deposition layer and the cladding layer inter-diffuse to form the Al-containing Co alloy layer 16. From the above, even if a treatment material containing an Al raw material is not used, an Al diffusion coating can be performed by heat-treating only the sliding component 12 having the cladding layer formed thereon.

As a heat-treatment furnace for Al diffusion coating, a solution treatment furnace for performing a solution treatment on a Ni-based single crystal alloy or a Ni-based unidirectionally solidified alloy, or an aging furnace for performing an aging treatment on the alloy may be used. In a solution treatment furnace or an aging furnace for an Al-containing Ni alloy such as a Ni-based single crystal alloy or a Ni-based unidirectionally solidified alloy, Al contained in the Al-containing Ni alloy is vaporized during the solution treatment or the aging treatment, and Al is vapor-deposited onto the furnace wall. When the sliding component 12 having the cladding layer formed thereon is subjected to an Al diffusion coating in such a solution treatment furnace or aging furnace, Al that has adhered to the furnace wall is vaporized to generate Al vapor, and accordingly Al can be further supplied.

The heat-treatment temperature may be 800° C. or higher and 1300° C. or lower. A reason for this temperature range is because, if the heat-treatment temperature is lower than 800° C., the Al vapor pressure becomes low, and this makes it difficult to form the Al-containing Co alloy layer 16. A further reason is because, if the heat-treatment temperature is higher than 1300° C., there is a possibility that the Al-containing Co alloy layer 16 may partially melt.

The heat-treatment time may be 1 hour or longer and 50 hours or shorter. A reason for this time range is because, if the heat-treatment time is shorter than 1 hour, almost no deposition of Al is generated on the surface of a cladding layer, and this makes it difficult to form the Al-containing Co alloy layer 16. A further reason is because, if the heat-treatment time is longer than 50 hours, the amount of Al deposited on the surface of a cladding layer becomes large, and accordingly the thickness of the Al-containing Co alloy layer 16 becomes thick and the Al-containing Co alloy layer 16 easily detaches.

The heat-treatment atmosphere may be a non-oxidizing atmosphere in order to suppress oxidation of the sliding component 12 having the cladding layer formed thereon and to generate Al vapor. The heat-treatment atmosphere can be a vacuum atmosphere or an inert gas atmosphere such as an argon gas atmosphere. The heat-treatment atmosphere may be a vacuum atmosphere in order to generate a larger amount of Al vapor. For a diffusion coating apparatus, a heat-treatment furnace or the like for a general metallic material can be used.

When the sliding component 12 is formed of a Ni-based single crystal alloy or a Ni-based unidirectionally solidified alloy, an Al diffusion coating may be performed on a Ni-based single crystal alloy or a Ni-based unidirectionally solidified alloy at the same time as a solution treatment or an aging treatment is performed on the alloy. As described above, in a solution treatment furnace or an aging furnace for a Ni-based single crystal alloy or a Ni-based unidirectionally solidified alloy, an Al vapor-deposited film adheres to the furnace wall. Solution treatment conditions or aging treatment conditions for a Ni-based single crystal alloy or a Ni-based unidirectionally solidified alloy overlap with the conditions for an Al diffusion coating. Therefore, an Al diffusion coating can be performed on a Ni-based single crystal alloy or a Ni-based unidirectionally solidified alloy at the same time as a solution treatment or an aging treatment is performed on the alloy. This can enhance the productivity of the sliding component 10 with a wear-resistant coating.

In a method for forming the wear-resistant coating 14, after the Al diffusion coating step (S12), an oxidation treatment step may be provided in advance before application to an actual equipment such as a jet engine, the oxidation treatment step being a step for forming the first oxide layer 34 and the second oxide layer 36. In the oxidation treatment step, an oxidation treatment can be performed at 600° C. or higher in an oxidizing atmosphere such as an air atmosphere. This enables forming of the first oxide layer 34 and the second oxide layer 36 on the surface of the Al-containing Co alloy layer 16 before the sliding component 10 with a wear-resistant coating is exposed to the actual environment. It is needless to say that the first oxide layer 34 and the second oxide layer 36 may be formed by oxidizing the Al-containing Co alloy layer 16 during the operation of an actual equipment such as a jet engine without providing an oxidation treatment step.

Figure 5:
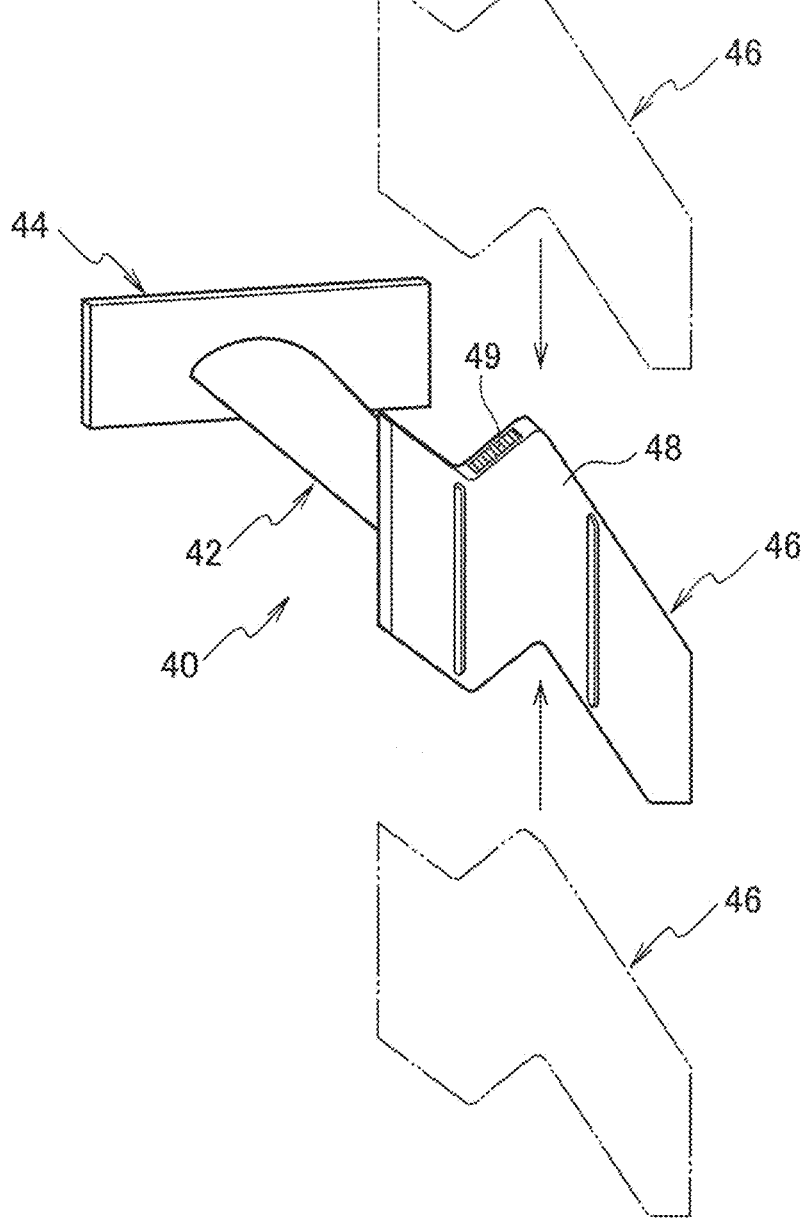
FIG. 5 is a schematic view showing the structure of a turbine blade having a shroud portion with a Z notch in an embodiment of the present disclosure.

A turbine blade having a shroud portion with a Z notch can be suitably used for a gas turbine component as the sliding component 12. FIG. 5 is a schematic view showing the constitution of a turbine blade 40 having a shroud portion with a Z notch. The turbine blade 40 includes a blade portion 42, a dovetail portion 44, and a shroud portion 46. The shroud portion 46 include a Z notch 48. One shroud portion 46 with the Z notch 48 abuts adjacent shroud portions 46 shown by two-dot chain lines via side surfaces of the Z notch 48. The turbine blade 40 rotates at high speeds during the operation, and not only is subjected to periodic changes in shape and vibration but is also exposed to high-temperature combustion gas. This causes the side surfaces 49 of the Z notch 48 to slide while the side surfaces receive high surface pressure at a high temperature, and thus wear increases. By providing the wear-resistant coating 14 on each of the side surfaces 49 of the Z notch 48, the wear resistance of the side surfaces 49 of the Z notch 48 can be enhanced.

According to the above configuration, a wear-resistant coating includes, at least on the surface side thereof, an Al-containing Co alloy layer that contains Co as a main component, at least one of W, Ni, Mo, Fe, Si, and C, Cr, and 0.3% by mass or more and 26% by mass or less of Al. As a result, the oxidation resistance of the wear-resistant coating is excellent even in a high temperature environment exceeding 1000° C. This can enhance the wear resistance of a sliding component having the wear-resistant coating.

According to the above configuration, the method includes a cladding step for cladding a Co alloy on a sliding surface of a sliding component formed of a Ni alloy to form a cladding layer, the Co alloy containing at least one of W, Ni, Mo, Fe, Si, and C, Cr, and a balance of Co as a main component and inevitable impurities. The method further includes an Al diffusion coating step for subjecting the sliding component having the cladding layer formed thereto to an Al diffusion coating so that the content of Al at least on the surface side of the cladding layer is 0.3% by mass or more and 26% by mass or less. Accordingly, a wear-resistant coating with enhanced wear resistance can be formed even in a high temperature environment exceeding 1000° C.

Second Embodiment

Hereinafter, a second embodiment of the present disclosure will be described in detail with reference to the drawings. The second embodiment differs from the first embodiment in terms of the method for forming a wear-resistant coating, but the structure of the wear-resistant coating is the same in both embodiments. The method for forming the wear-resistant coating includes a cladding step. The same components as those in the first embodiment are denoted with the same reference numerals and detailed description thereof will be omitted.

In the cladding step, a cladding layer is formed by cladding a cladding material that includes a Co alloy and an Al raw material on a sliding surface 12a of a sliding component 12 formed of a Ni alloy, in such a way that the content of Al at least on the surface side of the cladding layer is 0.3% by mass or more and 26% by mass or less, the Co alloy containing at least one of W, Ni, Mo, Fe, Si, and C, Cr, and a balance of Co as a main component and inevitable impurities.

The cladding material contains a Co alloy and an Al raw material. The Co alloy contains at least one of W, Ni, Mo, Fe, Si, and C, Cr, and a balance of Co as a main component and inevitable impurities. As a Co alloy, a Stellite alloy, a Tribaloy alloy or the like can be used. As an Al raw material, pure Al or an Al alloy can be used.

When the cladding material is a powder, a mixed powder obtained by mixing a Co alloy powder and an Al raw material powder at a predetermined ratio may be used as a cladding material. The ratio of the Co alloy powder to Al raw material powder is adjusted so that the content of Al at least on the surface side of the cladding layer is 0.3% by mass or more and 26% by mass or less.

When the cladding material is a welding rod, the surface of a welding rod made of a Co alloy may be coated with an Al raw material and the coated welding rod may be used as a cladding material. For example, a physical vapor deposition method (a PVD method) such as sputtering can be applied to the coating with an Al raw material. The thickness of the coating with an Al raw material is adjusted so that the content of Al at least on the surface side of the cladding layer is 0.3% by mass or more and 26% by mass or less. Further, the cladding material may be formed by blending an Al raw material in advance in a welding rod made of a Co alloy. The blending amount of the Al raw material is adjusted so that the content of Al at least on the surface side of a cladding layer is 0.3% by mass or more and 26% by mass or less.

The cladding layer is formed by cladding the cladding material on the sliding surface 12a of the sliding component 12 formed of a Ni alloy, and the content of Al at least on the surface side of a cladding layer is set to 0.3% by mass or more and 26% by mass or less. As a cladding method, general laser cladding welding, TIG welding, thermal spraying, or the like can be used. The thickness of the cladding layer may be, for example, 5 μm or thicker and 3000 μm or thinner, 5 μm or thicker and 1000 μm or thinner, or 5 μm or thicker and 500 μm or thinner.

In the cladding step, the cladding layer is formed by cladding a cladding material formed of a Co alloy on the sliding surface 12a of the sliding component 12 formed of an Al-containing Ni alloy containing Al, the Co alloy containing at least one of W, Ni, Mo, Fe, Si, and C, Cr, and a balance of Co as a main component and inevitable impurities. Also in the cladding step, an Al-containing Ni alloy is blended into the cladding layer during cladding so that the content of Al at least on the surface side of the cladding layer may be set to 0.3% by mass or more and 26% by mass or less.

A portion of the Al-containing Ni alloy forming the sliding component 12 is blended into the cladding layer during cladding of the cladding material formed of a Co alloy. This sets the content of Al at least on the surface side of the cladding layer to 0.3% by mass or more and 26% by mass or less. In order to set the content of Al at least on the surface side of the cladding layer to 0.3% by mass or more and 26% by mass or less, the amount of an Al-containing Ni alloy to be blended into the cladding layer may be adjusted in advance. As a cladding method, general laser cladding welding or the like can be used as described above.

According to the configuration described above, the method includes a cladding step for forming, on a sliding surface of a sliding component formed of a Ni alloy, a cladding layer by cladding a cladding material that includes a Co alloy and an Al raw material, in such a way that the content of Al at least on the surface side of a cladding layer is 0.3% by mass or more and 26% by mass or less, the Co alloy containing at least one of W, Ni, Mo, Fe, Si, and C, Cr, and a balance of Co as a main component and inevitable impurities. Accordingly, a wear-resistant coating with enhanced wear resistance can be formed even in a high temperature environment exceeding 1000° C.

According to the configuration described above, the method includes a cladding step for forming a cladding layer by cladding a cladding material formed of a Co alloy on a sliding surface of a sliding component formed of an Al-containing Ni alloy containing Al, the Co alloy containing at least one of W, Ni, Mo, Fe, Si, and C, Cr, and a balance of Co as a main component and inevitable impurities. Also in the cladding step, an Al-containing Ni alloy is blended into the cladding layer during cladding so that the content of Al at least on the surface side of the cladding layer is 0.3% by mass or more and 26% by mass or less. Accordingly, a wear-resistant coating with enhanced wear resistance can be formed even in a high temperature environment exceeding 1000° C.

Third Embodiment

Figure 6:
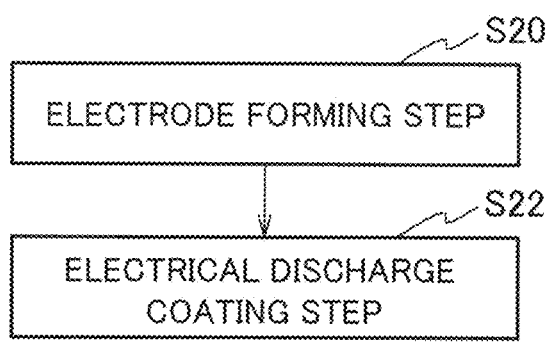
FIG. 6 is a flow chart showing a method for forming a wear-resistant coating in an embodiment of the present disclosure.
Figure 7:
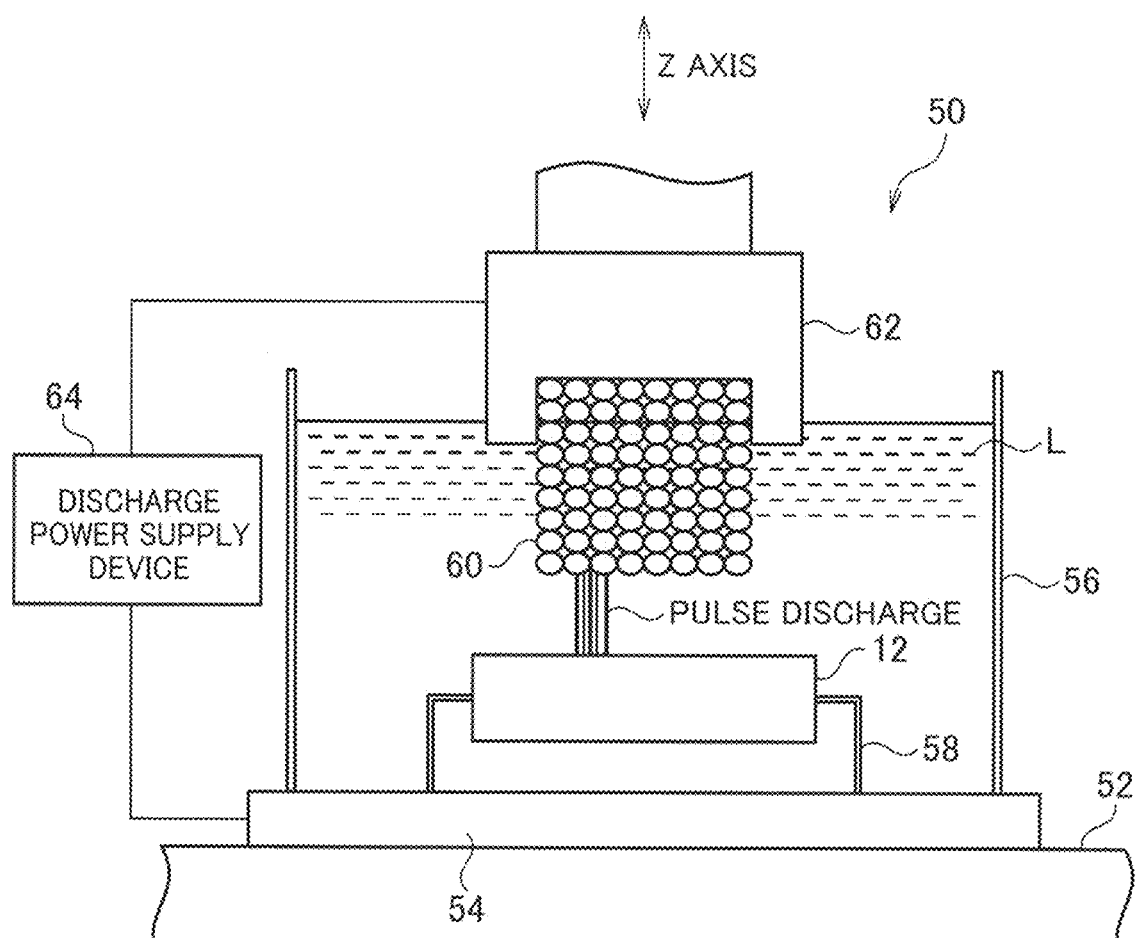
FIG. 7 is a schematic diagram showing the constitution of an electric discharge machining apparatus in an embodiment of the present disclosure.

A third embodiment of the present disclosure will be described in detail below with reference to the drawings. The third embodiment differs from the first and second embodiments in terms of the method for forming a wear-resistant coating, but the structure of the wear-resistant coating is the same among the embodiments. FIG. 6 is a flow chart showing a method for forming a wear-resistant coating. The method for forming a wear-resistant coating includes an electrode forming step (S20) and an electrical discharge coating step (S22). The same components as those in the first and second embodiments are denoted with the same reference numerals and detailed description thereof will be omitted.

In the electrode forming step (S20), a Co alloy powder is mixed with an Al raw material powder to form an electrical discharge coating electrode, the Co alloy powder containing at least one of W, Ni, Mo, Fe, Si, and C, Cr, and a balance of Co as a main component and inevitable impurities. The electrode forming step (S20) includes an electrode powder forming process, a granulation process, a compression molding process, and a firing process.

In the electrode powder forming process, the Co alloy powder and the Al raw material powder are pulverized to form a large-particle size powder with an average particle size of 8 μm or less and a small-particle size powder with a particle size of 3 μm or less, the Co alloy powder containing at least one of W, Ni, Mo, Fe, Si, and C, Cr, and a balance of Co as a main component and inevitable impurities. As the Co alloy powder, a Co alloy powder such as a Stellite alloy powder or a Tribaloy alloy powder can be used. As the Al raw material powder, a pure Al powder or an Al alloy powder can be used. As the Co alloy powder and the Al raw material powder, a powder formed based on an atomizing method or the like can be used. As the Co alloy powder and Al raw material powder, for example, powders in which the 90% accumulation particle size (D90) for the accumulated particle distribution is smaller than 22 μm may be used.

The Co alloy powder and Al raw material powder are pulverized by using a ball mill, a beads mill, a jet mill, or the like. When the powders are pulverized by using a ball mill or a beads mill, the powders are classified into a large-particle size powder with an average particle size of 8 μm or less by adjusting the operation time, and the ratio of a small-particle size powder with a particle size of 3 μm or less is measured by using a particle size distribution meter. If needed, the powders are further classified into a small-particle size powder with a particle size of 3 μm or less to adjust the particle size distribution. When the powders are pulverized by using a jet mill, a large-particle size powder with an average particle size of 8 μm or less and a small-particle size powder with a particle size of 3 μm or less are formed by adjusting the operation time. As a jet mill, a swirl flow type jet mill or the like can be used. The grinding pressure may be 0.4 MPa or higher and 2.6 MPa or lower. A large-particle size powder is classified and collected by using a cyclone or the like. A small-particle size powder is collected by using a bag filter or the like. The shape of each large-particle size powder may be spherical or polygonal. The shape of each small-particle size powder may be a scale shape.

When an electrode is formed by using a large-particle size powder and a small-particle size powder, small-particle size powder particles can be interposed between large-particle size powder particles. This appropriately adjusts the density of the electrode so as not to become excessively large, and can suppress the thermal conductivity of the electrode to be low. As a result, the heat of the discharge plasma is less likely to escape from a tip of the electrode. Accordingly, the temperature of the tip of the electrode becomes high, and the electrode material is easily melted or semi-melted.

The reason why the average particle size of a large-particle size powder is 8 μm or less is because, if the average particle size of a large-particle size powder is larger than 8 μm, abnormal discharge is likely to occur. The reason why the particle size of a small-particle size powder is 3 μm or less is because, if the particle size of a small-particle size powder is larger than 3 μm, the density of an electrode is likely to increase. The particle size of a small-particle size powder may be 1 μm or less. The average particle size is a particle size (a median diameter) with which the results of the particle size distribution are accumulated in the order from the powder with the smallest particle size by using, for example, the particle size distribution obtained by a measurement based on a laser diffraction/scattering method, and the accumulated value becomes 50°.

In the granulation process, a large-particle size powder with an average particle size of 8 μm or less and a small-particle size powder with a particle size of 3 μm or less are mixed and granulated to form a granulated powder. First, a slurry is prepared by mixing a large-particle size powder in a Co alloy powder and Al raw material powder with a small-particle size powder in a Co alloy powder and Al raw material powder. The mixing ratio of the large-particle size powder and small-particle size powder may be set such that, when the total of the large-particle size powder and small-particle size powder is set as 100% by mass, the content of the small-particle size powder may be 30% by mass or more and less than 100% by mass. The reason for this is because, if the content of the small-particle size powder is less than 30% by mass, the density of the electrode increases, and the thermal conductivity of the electrode is likely to increase.

The mixing ratio of the Co alloy powders and Al raw material powder is adjusted such that the content of Al at least on the surface side of a cladding layer is 0.3% by mass or more and 26% by mass or less when an electrical discharge coating is performed in an electrical discharge coating step (S22), which will be described later.

The slurry is prepared by adding, to a solvent stored in a storage tank, a large-particle size powder in a Co alloy powder and an Al raw material powder, a small-particle size powder in a Co alloy powder and an Al raw material powder, a binder, and a lubricant, and stirring and mixing them with a stirrer or the like. As a binder, for example, a thermoplastic resin such as polypropylene (PP), polyethylene (PE), polymethylmethacrylate (PMMA), or polyvinyl alcohol (PVA), or a polysaccharide substance such as agar is used. As a lubricant, stearic acid, paraffin wax, zinc stearate, or the like can be used. An amount of 1% by mass or more and 5% by mass or less of a lubricant may be added to the slurry, for example.

After the slurry is prepared, a granulated powder is formed by using a spray dryer or the like. When granulating is performed by using a spray dryer, the slurry is sprayed from a nozzle of a spray dryer into a high temperature nitrogen gas atmosphere in the spray dryer. This dries and removes the solvent contained in the slurry to form a granulated powder.

The compression molding process is a step for compressing and molding the granulated powder to mold a green compact. The granulated powder is filled into a molding die and pressurized with a press. This compresses and molds the granulated powder to mold a green compact. For the compression molding process, a CIP (cold isostatic press) may be included.

In the firing process, the green compact is heated and fired to form an electrode formed of a sintered compact. The green compact is fired using a heating furnace such as a vacuum heating furnace or an atmospheric furnace. The green compact is subjected to a heat treatment with a heater or the like in a vacuum, and in an inert gas atmosphere or a reducing atmosphere to be sintered. The firing may be performed to such an extent that the bonding at contact portions between powder particles is moderately strengthened while the shape of the electrode powder is maintained.

The firing temperature may be 750° C. or higher and 1000° C. or lower. The reason for this temperature range is because, if the firing temperature is lower than 750° C., there is a possibility that the bonding at contact portions between powder particles may become weak. A further reason is because, if the firing temperature is higher than 1000° C., there is a possibility that the bonding at contact portions between powder particles may become excessively strong. The holding time at the firing temperature may be 5 hours or longer and 15 hours or shorter.

An electrical discharge coating electrode may have an electrical resistivity of 1 mΩ·cm to 30 mΩ·cm. The electrical resistivity is adjusted by adjusting the powder shape, molding density, and firing temperature. There is a negative correlation between the thermal conductivity and the electrical resistivity. That is, when the thermal conductivity is low, the electric conductivity becomes low, and this increases the electrical resistivity. When the electrical resistivity of the electrical discharge coating electrode is in the above range, it is possible to sufficiently follow the cycle of pulse discharge and to appropriately suppress the thermal conductivity. This makes it difficult for the heat of the discharge plasma to escape from the tip of the electrical discharge coating electrode. Accordingly, the temperature of the tip of the electrical discharge coating electrode can be maintained at a high temperature. The electrical discharge coating electrode is formed as described above.

In the electrical discharge coating step (S22), discharge is generated between the electrical discharge coating electrode and the sliding component 12 formed of a Ni alloy to perform an electrical discharge coating. Accordingly, in this step, a cladding layer is formed on the sliding surface 12a of the sliding component 12, and the content of Al at least on the surface side of the cladding layer is 0.3% by mass or more and 26% by mass or less.

First, an electric discharge machining apparatus used for the electrical discharge coating will be described. FIG. is a schematic diagram showing the constitution of an electric discharge machining apparatus 50. The electric discharge machining apparatus 50 includes a bed 52. A table 54 is provided on the bed 52. A liquid tank 56 is provided on the table 54, the liquid tank 56 storing an electrically insulating liquid L such as insulating oil. A jig 58 to which the sliding component 12 can be set is provided in the liquid tank 56. An electrode holder 62 for holding an electrical discharge coating electrode 60 is provided above the table 54 so as to be movable in the X-axis direction, the Y-axis direction, and the Z axis direction. The electrode holder 62 is configured to be rotatable with the Z axis as a rotation axis. A discharge power supply device 64 is electrically connected to the jig 58 and the electrode holder 62. The discharge power supply device 64 may be a known discharge power supply device.

Next, an electrical discharge coating method will be described. The sliding component 12 is set to the jig 58. The electrode holder 62 holding the electrical discharge coating electrode 60 is moved in the X-axis direction or the Y-axis direction to position the electrical discharge coating electrode 60 relative to the sliding component 12. Next, while reciprocating the electrode holder 62 in the Z axis direction, the discharge power supply device 64 causes a pulse-like discharge to be generated between the electrical discharge coating electrode 60 and the sliding component 12 in the electrically insulating liquid L. Due to the energy of this discharge, an electrode material or a reaction substance of the electrode material is adhered to the sliding surface 12a of the sliding component 12 to form the wear-resistant coating 14.

Specifically, when discharge is generated between the electrical discharge coating electrode 60 and the sliding component 12, a portion of the electrode material is separated from the electrical discharge coating electrode 60 by a blast or electrostatic force due to the discharge. The portion of the electrode material is also melted or semi-melted by the heat of discharge plasma. The separated portion of the electrode material moves toward the sliding component in a molten or semi-molten state, reaches the sliding surface 12a of the sliding component 12, and is re-solidified to form metallic particles. By continuously generating the pulse-like discharge, the electrode material at the tip of the electrical discharge coating electrode 60 is successively moved to the sliding surface 12a of the sliding component 12. At the sliding surface 12a, the electrode material is deposited while being re-solidified. This stacks metallic particles on the sliding surface 12a of the sliding component 12. For the discharge conditions, for example, it is possible to set a peak current value Ip of the initial part of the waveform of the discharging pulse current supplied between the electrical discharge coating electrode 60 and the sliding component 12 to 30 A or 40 A. For the discharge conditions, it is also possible to set a peak current value Ie of the middle part or thereafter to 1 A to 25 A, to set a pulse width to of the discharging pulse current to 2 μs to 30 μs, and to set the quiescent time to 64 μs.

In this way, discharge is generated between the electrical discharge coating electrode 60 and the sliding component 12 to perform an electrical discharge coating. Accordingly, a cladding layer is formed on the sliding surface 12a of the sliding component 12, and the content of Al at least on the surface side of the cladding layer is set to 0.3% by mass or more and 26% by mass or less. The thickness of the cladding layer may be, for example, 5 μm or thicker and 3000 μm or thinner, 5 μm or thicker and 1000 μm or thinner, or 5 μm or thicker and 500 μm or thinner. In the electrical discharge coating, localized coating is possible, and thus the wear-resistant coating 14 can be formed only on the sliding surface 12a of the sliding component 12.

In the electrode forming step, the electrical discharge coating electrode may be formed of Al-containing Co alloy powders, the Al-containing Co alloy powders containing at least one of W, Ni, Mo, Fe, Si, and C, Cr, 0.3% by mass or more of Al, and a balance of Co as a main component and inevitable impurities. The electrode forming step differs from the electrode forming step (S20) with regard to the Al-containing Co alloy powder as a raw material for forming the electrical discharge coating electrode, and the other configurations are the same as those in the electrode forming step (S20).

The raw material for forming the electrical discharge coating electrode is formed of an Al-containing Co alloy powder which contains at least one of W, Ni, Mo, Fe, Si, and C, Cr, 0.3% by mass or more of Al, and a balance of Co as a main component and inevitable impurities. The Al-containing Co alloy powder can be formed of an Al-containing Co alloy further containing 0.3% by mass or more of Al, for example, in place of a portion of the Co in a Co alloy such as a Stellite alloy or a Tribaloy alloy. The reason why the content of Al is 0.3% by mass or more is because, if the content of Al is less than 0.3% by mass, it becomes difficult to form the Al-containing Co alloy layer 16. For example, the content of Al may be 0.3% by mass or more and 26% by mass or less.

Other configurations in the electrode forming step are the same as in the electrode powder forming process, the granulation process, the compression molding process, and the firing process in the electrode forming step (S20), and therefore a detailed description thereof will be omitted. Further, since the electrical discharge coating step performed after the electrode forming step is the same as the electrical discharge coating step (S22), a detailed description thereof will be omitted.

According to the above configuration, the method includes an electrode forming step for mixing a Co alloy powder with an Al raw material powder to form an electrical discharge coating electrode, the Co alloy powder containing at least one of W, Ni, Mo, Fe, Si, and C, Cr, and a balance of Co as a main component and inevitable impurities. The method further includes an electrical discharge coating step for forming a cladding layer on a sliding surface of a sliding component by generating discharge between the electrical discharge coating electrode and the sliding component formed of a Ni alloy, to perform an electrical discharge coating so that the content of Al at least on the surface side of the cladding layer is 0.3% by mass or more and 26% by mass or less. Accordingly, a wear-resistant coating with enhanced wear resistance can be formed even in a high temperature environment exceeding 1000° C.

According to that above configuration, the method includes an electrode forming step for forming an electrical discharge coating electrode with an Al-containing Co alloy powder which contains at least one of W, Ni, Mo, Fe, Si, and C, Cr, 0.3% by mass or more of Al, and a balance of Co as a main component and inevitable impurities. The method further includes an electrical discharge coating step for forming a cladding layer on a sliding surface of a sliding component by generating discharge between an electrical discharge coating electrode and a sliding component formed of a Ni alloy, to perform an electrical discharge coating so that the content of Al at least on the surface side of the cladding layer is 0.3% by mass or more and 26% by mass or less. Accordingly, a wear-resistant coating with enhanced wear resistance can be formed even in a high temperature environment exceeding 1000° C.

Example

A wear-resistant coating was formed and an evaluation test of the wear-resistant coating was performed. First, a method for forming the wear-resistant coating will be described.

A forming method of Example 1 will be described. CMSX-4, which is a Ni-based single crystal alloy was used as a substrate. The alloy composition of CMSX-4 includes 6.5% by mass of Cr, 9° by mass of Co, 0.6° by mass of Mo, 6° by mass of W, 6.5% by mass of Ta, 3% by mass of Re, 5.6% by mass of Al, 1% by mass of Ti, 0.1% by mass of Hf, and a balance of Ni and inevitable impurities.

A Co alloy was cladded on the surface of the substrate to form a cladding layer. A Tribaloy T-800 alloy was used as a Co alloy. A Tribaloy T-800 alloy is a Co alloy which contains 18% by mass of Cr, 0.08% by mass or less of C, 1.5% by mass or less of Ni, 28% by mass of Mo, 1.5% by mass or less of Fe, 3.4° by mass of Si, and a balance of Co and inevitable impurities. Laser cladding welding was used as a cladding method. The thickness of the cladding layer was 2000 μm.

Next, the substrate having the cladding layer formed thereon was subjected to an Al diffusion coating. In the Al diffusion coating, the substrate having the cladding layer formed thereon was placed in a heat-treatment furnace and heat-treated at 1250° C. in a vacuum atmosphere. The heat-treatment time was 2 hours. In the Al diffusion coating, only the substrate having the cladding layer formed thereon was placed in the heat-treatment furnace without using a treatment material containing an Al raw material, and Al vapor was generated by vaporizing Al contained in the substrate.

A forming method of Example 2 will be described. The forming method of Example 2 differs from the forming method of Example 1 in terms of the Al diffusion coating, but the substrate and the method for forming the cladding layer are the same as those of Example 1. In the Al diffusion coating, first, an Al—Cr alloy powder, $AlF_3$ powder, and $Al_2O_3$ powder were mixed to prepare a treatment material. Next, the substrate having the cladding layer formed thereon and the treatment material were placed into a heat-treatment furnace to be subjected to a heat-treatment at 1100° C. in an argon gas atmosphere. The heat-treatment time was 2 hours.

Cross-sectional areas of the surface side of the wear-resistant coatings prepared based on the forming methods of Examples 1 and 2 were observed by using a scanning electron microscope (SEM). Further, an analysis was made for alloy components in the depth direction from the surfaces of the wear-resistant coatings of Examples 1 and 2 by means of energy dispersive X-ray analysis (EDX). The alloy components were analyzed at three positions that are a position about 10 μm from the surface of the wear-resistant coating in the depth direction, a position about 100 μm from the surface of the wear-resistant coating in the depth direction, and a position about 500 μm from the surface of the wear-resistant coating in the depth direction.

Figure 8:
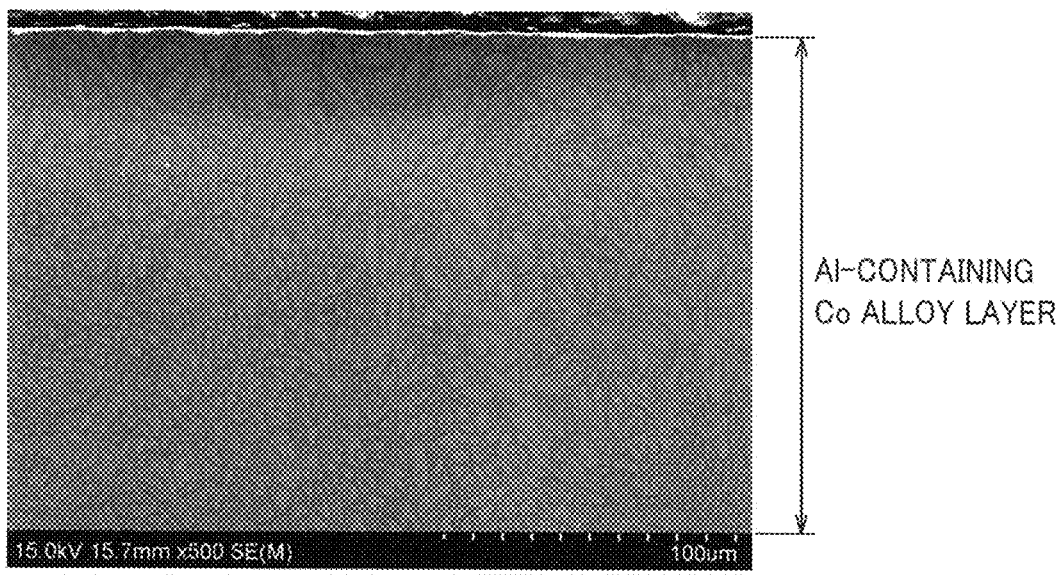
FIG. 8 is a photograph showing observation results of a cross-sectional area of a wear-resistant coating of Example 1 in an embodiment of the present disclosure.

FIG. 8 is a photograph showing an observation result of a cross-sectional area on the surface side of the wear-resistant coating of Example 1. On the surface side of the wear-resistant coating of Example 1, an Al-containing Co alloy layer was formed as a single layer. At all analysis positions for alloy components, Al, and Cr, C, Ni, Mo, Fe, Si, and Co which are alloy components of a Tribaloy T-800 alloy were detected. The content of Al was 0.3% by mass or more and 0.5% by mass or less at all analysis positions.

Figure 9:
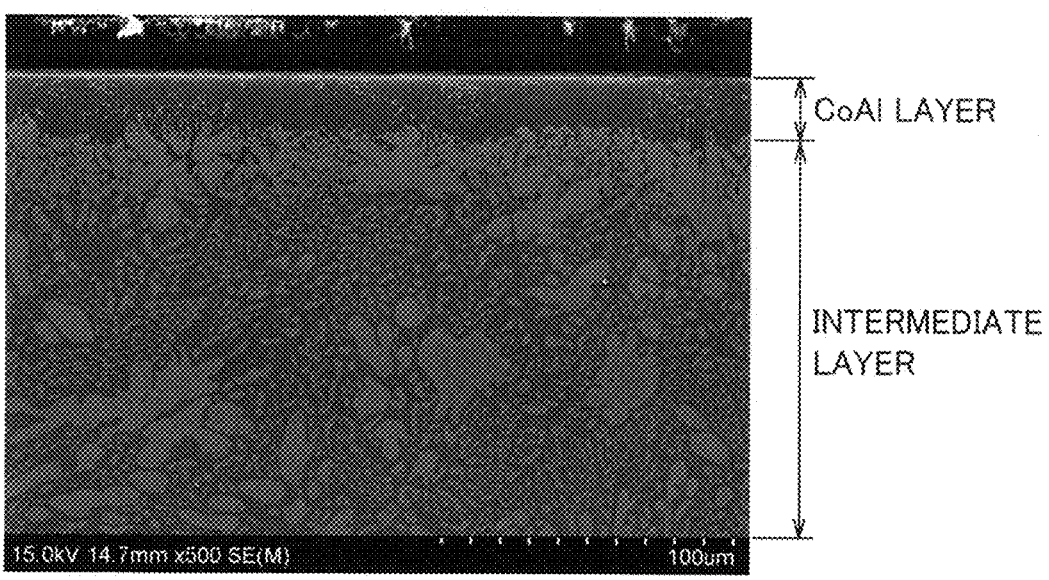
FIG. 9 is a photograph showing observation results of a cross-sectional area of a wear-resistant coating of Example 2 in an embodiment of the present disclosure.

FIG. 9 is a photograph showing an observation result of a cross-sectional area on the surface side of the wear-resistant coating of Example 2. On the surface side of the wear-resistant coating of Example 2, an Al-containing Co alloy layer was formed of two layers. At all analysis positions for alloy components, Al, and Cr, C, Ni, Mo, Fe, Si, and Co which are alloy components of a Tribaloy T-800 alloy were detected. The content of Al at a position about 10 μm from the surface side of the wear-resistant coating was 25% by mass. The content of Al at a position about 100 μm from the surface side of the wear-resistant coating was 3% by mass. The content of Al at a position about 500 μm from the surface side of the wear-resistant coating was 0.3% by mass or more and 0.5% by mass or less. The content of Al at a position about 10 μm from the surface of the wear-resistant coating was high at 25° by mass, and this indicated the formation of a CoAl phase. As described above, the Al-containing Co alloy layer was formed of a CoAl layer and an intermediate layer. The CoAl layer was provided on the surface side of the wear-resistant coating and contains a CoAl phase. The intermediate layer was provided on the substrate side of the CoAl layer and has a smaller content of Al than the CoAl layer.

Figure 10:
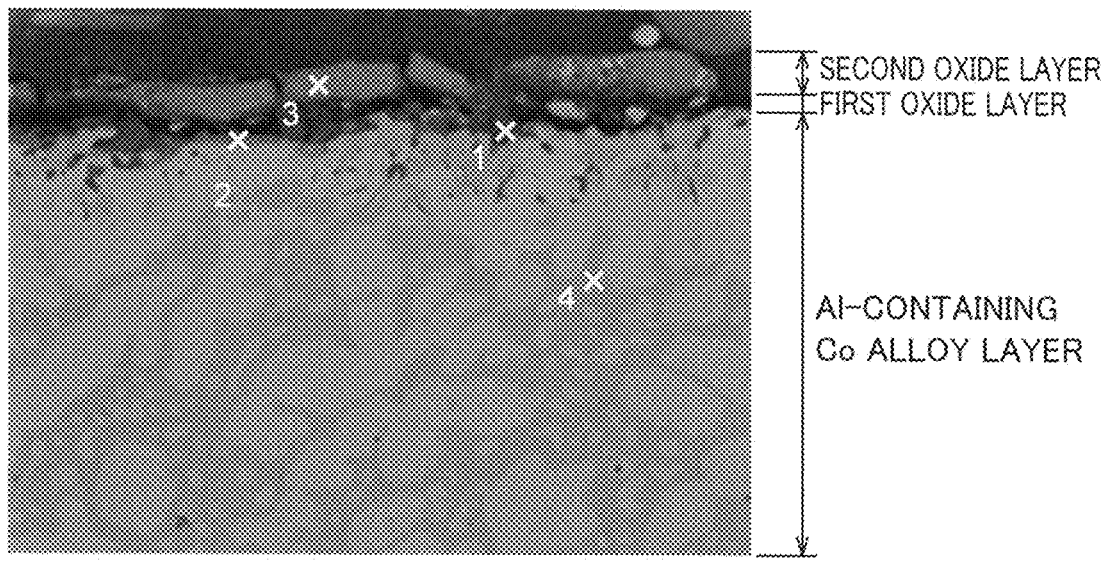
FIG. 10 is a photograph showing observation results of a cross-sectional area of a wear-resistant coating of Example after being subjected to an oxidation treatment in an embodiment of the present disclosure.

Next, the wear-resistant coating of Example 1 was subjected to an oxidation treatment. The oxidation treatment was performed at 1080° C. for 10 hours in an air atmosphere. The wear-resistant coating after being subjected to an oxidation treatment was analyzed by means of a scanning electron microscope (SEM) and energy dispersive X-ray analysis (EDX). FIG. 10 is a photograph showing an observation result of a cross-sectional area of the wear-resistant coating of Example 1 after being subjected to the oxidation treatment. Numerals 1 to 4 shown in the photograph of FIG. 10 show positions of an alloy component which were analyzed by means of energy dispersive X-ray analysis (EDX). Table 1 shows the results of analysis of four positions shown as numbers 1 to 4 in the photograph of FIG. 10 of an alloy component by means of energy dispersive X-ray analysis (EDX). The composition of numeral 1 shows analysis results of a first oxide layer formed on the surface of a Co alloy phase in an Al-containing Co alloy layer. The composition of numeral 2 shows analysis results of a first oxide layer formed on the surface of a Laves phase in an Al-containing Co alloy layer. The composition of numeral 3 shows analysis results of a second oxide layer. The composition of numeral 4 shows analysis results of an Al-containing Co alloy layer.

TABLE 1

| | ALLOY COMPOSITION (% BY MASS) | | | | | | | |
|---|---|---|---|---|---|---|---|---|
| No. | O | Al | Si | Cr | Co | Ni | Mo | TOTAL |
| 1 | 21.0 | 0.3 | 14.1 | 6.1 | 30.1 | 3.3 | 25.1 | 100 |
| 2 | 11.5 | 1.6 | 3.8 | 10.5 | 37.0 | 4.3 | 31.3 | 100 |
| 3 | 36.3 | 0.1 | 0.3 | 62.4 | 0.4 | 0.4 | 0.1 | 100 |
| 4 | 0.6 | 0.3 | 0.6 | 16.4 | 64.4 | 9.4 | 8.3 | 100 |

FIG. 11 is a schematic diagram of a metal structure corresponding to the photograph of FIG. 10. In FIG. 11, A shows a resin mount, B shows a second oxide layer, C shows a first oxide layer on the surface of a Laves phase, D shows a first oxide layer on the surface of a Co alloy phase, E shows a Laves phase, and F shows a Co alloy phase.

A first oxide layer containing an Al oxide and a Cr oxide was formed on the surface of an Al-containing Co alloy layer. A second oxide layer containing an Al oxide and a Cr oxide was formed on the surface of the first oxide layer. It was observed that the first oxide layer had a higher concentration of Al and a larger content of an Al oxide than the second oxide layer. It was observed that the second oxide layer had a higher concentration of Cr and a larger content of a Cr oxide than the first oxide layer. It was also observed that a first oxide layer formed on the surface of a Laves phase had a higher concentration of Al and a larger content of an Al oxide than a first oxide layer formed on the surface of a Co alloy phase. It was observed that the second oxide layer had a high concentration of Cr and was mainly formed of a Cr oxide.

Next, an oxidation test was performed to evaluate the oxidation resistance of a wear-resistant coating in a high temperature environment exceeding 1000° C. First, a specimen for the oxidation test will be described. In the specimen of Example 3, a wear-resistant coating was formed on a substrate formed of CMSX-4 of a Ni single crystal alloy based on the same forming method as in Example 1. In the specimen of Comparative Example 1, with a Tribaloy T-800 alloy, a cladding layer was formed on a substrate formed of CMSX-4 of a Ni single crystal alloy by means of laser cladding welding. The specimen of Comparative Example 1 differs from the specimen of Example 3 in that an Al diffusion coating is not performed.

In the oxidation test method, after a test was performed at 1080° C. for 238 hours in an air atmosphere, the thickness of an oxide film was measured. The thickness of the oxide film in the specimen of Example 3 was 42 μm. The thickness of the oxide film in the specimen of Comparative Example 1 was 99 μm. From the above results, it was found that the wear-resistant coating of Example 3 had superior oxidation resistance compared to the cladding layer of Comparative Example 1.

Figure 12:
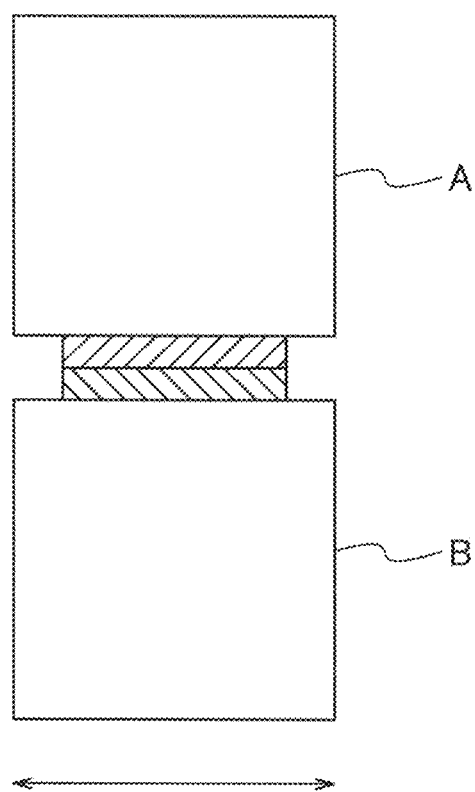
FIG. 12 is a diagram for explaining a fretting wear test in an embodiment of the present disclosure.

Next, a wear resistance test was performed to evaluate the wear resistance of a wear-resistant coating in a high temperature environment exceeding 1000° C. The wear resistance test was performed by means of a fretting wear test. FIG. 12 is a diagram for explaining the fretting wear test. First, a specimen will be described. In the specimen, a cladding layer was formed on a sliding surface of an upper jig A, and a wear-resistant coating was formed on a sliding surface of a lower jig B. CMSX-4 of a Ni single crystal alloy was used for the upper jig A and the lower jig B. The cladding layer was formed on the sliding surface of the upper jig A with a Tribaloy T-800 alloy. Four specimens were evaluated in the fretting wear test.

In the specimen of Example 4, the same wear-resistant coating as in Example 1 was formed on the sliding surface of the lower jig B. In the specimen of Example 5, after the same wear-resistant coating as in Example 1 was formed on the sliding surface of the lower jig B, an oxidation treatment was performed at 1080° C. for 238 hours in an air atmosphere. In the specimen of Example 6, after the same wear-resistant coating as in Example 2 was formed on the sliding surface of the lower jig B, an oxidation treatment was performed at 1080° C. for 238 hours in an air atmosphere. In the specimen of Comparative Example 2, after a cladding layer was formed on the sliding surface of the lower jig B with a Tribaloy T-800 alloy, an oxidation treatment was performed at 1080° C. for 238 hours in an air atmosphere.

Then, the sliding surfaces of the upper jig A and the lower jig B were made to face each other to load surface pressure, and the jigs were slid in the direction indicated by an arrow to evaluate the wear amount. In test conditions, the surface pressure was 3 MPa to 7 MPa, the sliding amount (amplitude) was ±0.5 mm, the sliding surface was 3 mmφ in diameter, and the number of times that sliding was performed was 1 million (6 hours). The fretting wear test was performed at 630° C., 1000° C., and 1080° C. individually in an air atmosphere, considering the use on the high temperature side of a low pressure turbine in a jet engine. The test results are shown by normalizing the wear amount of the specimen of Comparative Example 2 at 630° C. as 100. Table 2 shows the fretting wear test results of each specimen.

TABLE 2

| | WEAR TEST TEMPERATURE | | |
| --- | --- | --- | --- |
| | 630° C. | 1000° C. | 1080° C. |
| COMPARATIVE EXAMPLE 2 | 100 | 37 | 40 |
| EXAMPLE 4 | 4 | 5 | 8 |
| EXAMPLE 5 | 37 | 27 | 26 |
| EXAMPLE 6 | 6 | 8 | 8 |

As shown in Table 2, the specimens of Examples 4 to 6 had more enhanced wear resistance at all wear test temperatures than the specimen of Comparative Example 2. It was found that the specimens of Examples 4 to 6 are excellent in terms of the wear resistance of wear-resistant coatings even in a high temperature environment exceeding 1000° C.

The wear-resistant coating of the present disclosure has excellent wear resistance even in a high temperature environment exceeding 1000° C., and thus the present disclosure is useful for gas turbine components for aircraft and industrial use and the like.

What is claimed is:

1. A sliding component including a wear-resistant coating comprising:
   a sliding component formed of a Ni alloy; and
   a wear-resistant coating provided on a sliding surface of the sliding component;
wherein
   the wear-resistant coating includes an Al-containing Co alloy layer at least on a surface side of the wear-resistant coating, the Al-containing Co alloy layer containing Co whose percentage by mass is the largest therein as a main component, at least one of W, Ni, Mo, Fe, Si, and C, Cr, and 0.3% by mass or more and 26% by mass or less of Al,
   the wear-resistant coating further includes:
     a first oxide layer that is formed on a surface of the Al-containing Co alloy layer and includes an Al oxide and a Cr oxide; and
     a second oxide layer that is formed on a surface of the first oxide layer and includes an Al oxide and a Cr oxide,
   a percentage of the Al oxide by mass in the first oxide layer is larger than a percentage of the Al oxide by mass in the second oxide layer,
   a percentage of the Cr oxide by mass in the second oxide layer is larger than a percentage of the Cr oxide by mass in the first oxide layer, and
   the Al-containing Co alloy layer includes:
     a CoAl layer that is provided on the surface side of the wear-resistant coating and includes a CoAl phase; and
     an intermediate layer that is provided on a sliding component side of the CoAl layer, a percentage of Al by mass in the intermediate layer is smaller than a percentage of Al by mass in the CoAl layer,
   the Al oxide of each of the first and second oxide layers includes $Al_2O_3$, and
   the Cr oxide of each of the first and second oxide layers includes $Cr_2O_3$.

2. The sliding component including the wear-resistant coating according to claim 1, wherein
   the wear-resistant coating includes a Co alloy layer that is provided on a sliding component side of the Al-containing Co alloy layer and is formed of a Co alloy, the Co alloy containing Co, at least one of W, Ni, Mo, Fe, Si, and C, Cr, and impurities.

3. The sliding component including the wear-resistant coating according to claim 1, wherein
   the intermediate layer includes a CoAl phase.

4. The sliding component including the wear-resistant coating according to claim 1, wherein
   the intermediate layer does not include a CoAl phase.

* * * * *